United States Patent
Wetzer et al.

(10) Patent No.: US 6,820,038 B1
(45) Date of Patent: Nov. 16, 2004

(54) COMPONENT PROVISIONING OR ISSUANCE IN A MAINTENANCE, REPAIR OR OVERHAUL ENVIRONMENT

(75) Inventors: Michael Wetzer, Redwood City, CA (US); Gary R. Garrow, Burbank, CA (US); David P. West, II, Newnan, GA (US); Patrick E. Weir, San Francisco, CA (US); Gary Ashby, Kent (GB); Charles P. Newton, III, Rock Hill, SC (US)

(73) Assignee: Accenture Global Services GmbH (CH)

( * ) Notice: Subject to any disclaimer, the term of this patent is extended or adjusted under 35 U.S.C. 154(b) by 257 days.

(21) Appl. No.: 09/946,894

(22) Filed: Sep. 4, 2001

(51) Int. Cl.[7] .............................................. G06F 11/30
(52) U.S. Cl. ....................................... 702/184; 705/26
(58) Field of Search ......................... 702/184; 705/26; 700/96

(56) References Cited

U.S. PATENT DOCUMENTS

| | | | |
|---|---|---|---|
| 4,908,775 A | | 3/1990 | Palusamy et al. |
| 5,216,612 A | * | 6/1993 | Cornett et al. ................ 700/96 |
| 5,311,562 A | | 5/1994 | Palusamy et al. |
| 5,331,579 A | | 7/1994 | Maguire, Jr. et al. |
| 5,596,507 A | | 1/1997 | Jones et al. |
| 5,710,723 A | | 1/1998 | Hoth et al. |
| 5,737,728 A | | 4/1998 | Sisley et al. |
| 5,778,381 A | | 7/1998 | Sandifer |
| 5,877,961 A | | 3/1999 | Moore |
| 5,920,846 A | | 7/1999 | Storch et al. |
| 5,963,911 A | | 10/1999 | Walker et al. |
| 5,987,474 A | | 11/1999 | Sandifer |
| 6,067,486 A | | 5/2000 | Aragones et al. |
| 6,110,214 A | | 8/2000 | Klimasauskas |
| 6,128,543 A | | 10/2000 | Hitchner |
| 6,175,934 B1 | | 1/2001 | Hershey et al. |
| 6,192,325 B1 | | 2/2001 | Piety et al. |
| 6,230,480 B1 | | 5/2001 | Rollins, III |
| 2002/0072988 A1 | * | 6/2002 | Aram ......................... 705/26 |
| 2002/0156692 A1 | * | 10/2002 | Squeglia et al. ............. 705/26 |

OTHER PUBLICATIONS

McQueen, G., "Aircraft Maintenance," *Industrial Maintenance & Plant Operations*, Aug. 1996.

MIL–HDBK–61, Military Handbook, "Configuration Management Guidance," Sep. 1997.

* cited by examiner

*Primary Examiner*—John Barlow
*Assistant Examiner*—Xiuqin Sun
(74) *Attorney, Agent, or Firm*—Brinks Hofer Gilson & Lione

(57) ABSTRACT

A method and system for component provisioning supports the grouping of components to realize efficiencies in component provisioning. The method comprises identifying components for performance of at least one maintenance, repair, and overhaul of equipment. At least kit of components is established for the equipment. The kit comprises an assembly of one or more components that is gathered to support the aggregation of installation activities and performance of at least one of maintenance, repair, and overhaul. Acquisition of the identified components is authorized. The identified components are acquired pursuant to the terms of the authorization. The acquired components are dispersed in accordance with the metric that is measurable and traceable.

57 Claims, 6 Drawing Sheets

COMPONENT PROVISIONING OR ISSUANCE IN A MAINTENANCE, REPAIR OR OVERHAUL ENVIRONMENT

FIELD OF THE INVENTION

This invention relates to a method and system for component provisioning and issuance associated with at least one of maintenance, repair, and overhaul of equipment.

BACKGROUND

In the prior art, a maintenance planning arrangement may identify a plan for the replacement of a potentially or actually defective component in advance of scheduled maintenance (e.g. maintenance, repair, and overhaul) of an item of equipment. The prior art maintenance planning arrangement may prepare a list of components (for an item of equipment) that are subject to scheduled maintenance. The selection of the list of components may be subject to variation because of any of the following: (1) a change in a configuration required for an item of equipment, (2) a change or update in any constituent component of an item of equipment, or (3) an unpredicted performance degradation of an item or its constituent components. Accordingly, the components that may be ordered or otherwise provided for scheduled maintenance may differ from the components that are actually required during a maintenance process (e.g., maintenance, repair or overhaul) for the item. As a result, in some circumstances, the group of components provided may be over-inclusive and the worker may end up replacing components that do not require replacement to achieve a desired reliability or performance goal for the equipment. In other cases, the group of components provided may be under-inclusive and may include too few components such that the equipment fails to meet a reliability goal. Thus, a need exists for a more robust and effective manner of selecting a group of components for performance of maintenance, repair, overhaul, or other related activities. A need also exists for introducing some standardization in the selection of components and in the ordering of components.

SUMMARY OF THE INVENTION

In accordance with the invention, a method for component provisioning or issuance supports the grouping of components to realize efficiencies in component provisioning. The method comprises identifying components for performance of at least one of maintenance, repair, and overhaul of an item of equipment. At least one kit of components is established for the item of equipment. The kit comprises a group of one or more components that is gathered to support the aggregation of installation activities or otherwise grouped to support integration of multiple maintenance tasks associated with at least one of maintenance, repair, and overhaul.

In accordance with one aspect of the invention, a data processing system supports preparation for the acquisition of the identified components. The identified components may be acquired consistent with the preparation (e.g., authorization). The acquired components may be dispersed or distributed in accordance with a metric (e.g., a measurable and traceable metric).

DETAILED DESCRIPTION OF THE INVENTION

As used herein, a maintenance provider shall include any person or business entity that performs or supports maintenance, repair, or overhaul activity (i.e., an MRO activity) for at least one item of equipment. Similarly, maintenance, a maintenance activity or a maintenance task shall include at least one of maintenance, repair, and overhaul (i.e., MRO) of an item of equipment or a component of the equipment.

A component means a component of an item of equipment, a sub-component of an item of equipment, an assembly of an item of equipment, a system of an item of equipment, or any other constituent component of an item of equipment. A component may include, but need not include, one or more sub-components. An assembly may comprise a group of integrated or inter-related components. A material refers to a raw material, a consumable material, a component, a provision, or another equipment-related resource concerning the performance of a maintenance activity.

Provisioning refers to preparing for execution of a maintenance activity or preparing the availability of components or other resources for a maintenance plan. For example, provisioning may include any of the following: acquiring components for a maintenance plan, organizing components or materials into a virtual kit for a maintenance plan, and planning or positioning resources for implementation of the maintenance plan. Issuance refers to making components and resources available for or during the execution of a maintenance plan. For example, issuance may include distribution of components to one or more geographic locations consistent with a maintenance plan or providing a physical kit to one or more geographic locations consistent with a maintenance plan.

Figure 1:
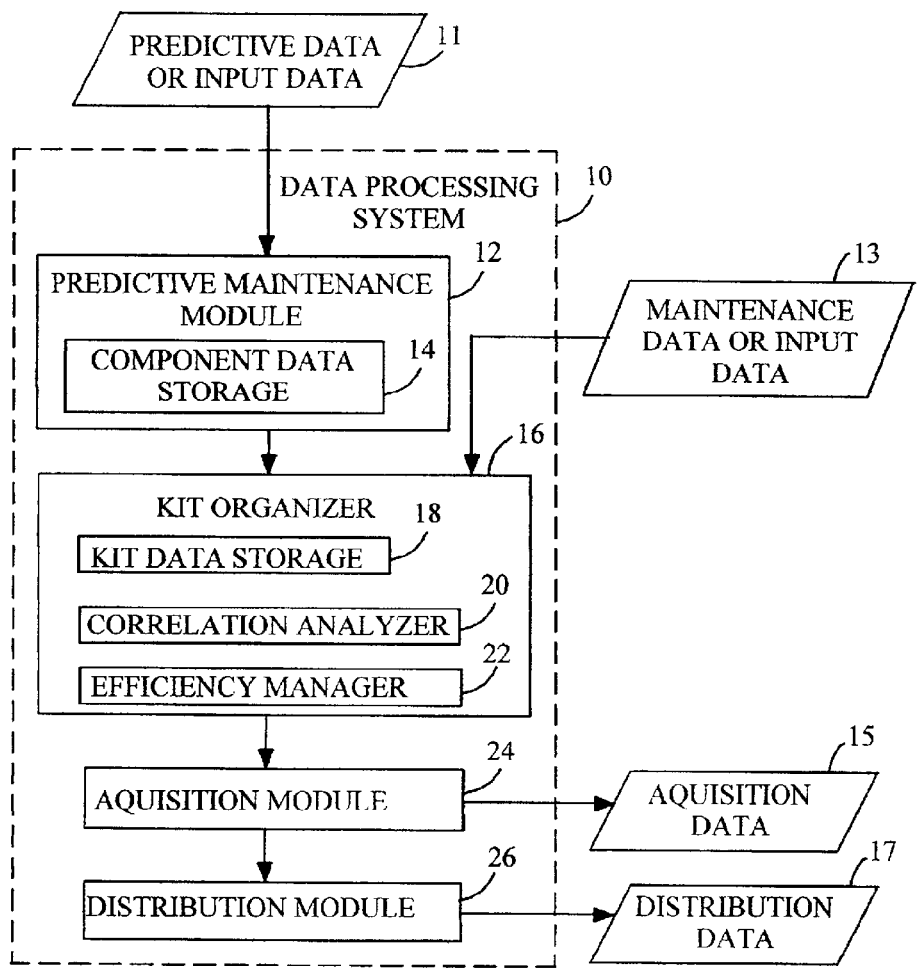
FIG. 1 is a block diagram of the data processing system that shows data inputs and data outputs of a data processing system in accordance with the invention.

In accordance with FIG. 1, the data processing system 10 includes a predictive maintenance module 12 coupled to a kit organizer 16. In turn, the kit organizer 16 communicates with an acquisition module 24. The acquisition module 24 may communicate with a distribution module 26.

The data processing system 10 may receive an input of predictive data 11, maintenance data 13, or both. The predictive data or the maintenance data may be referred to generally as input data. The predictive data 11 may be applied to the predictive maintenance module 12 of the data processing system 10. Further, the maintenance data 13 or a maintenance plan may be applied to the kit organizer 16. The data processing system 10 may provide one or more outputs. For example, the acquisition module 24 may provide an output of acquisition data 15 and the distribution module 26 may provide an output of distribution data 17.

The predictive maintenance module 12 may manage component data storage 14 to include estimates of components and respective maintenance tasks required to properly perform maintenance for a specific item of equipment or a constituent component of the item. The component data storage 14 may comprise component identifiers, component descriptions, component requirements, component demand, component inventory, or other information associated with component provisioning.

The kit organizer 16 may include kit data storage 18, a correlation analyzer 20, and an efficiency manager 22. Kit data storage 18 may support establishing and/or maintaining a definition of a kit. A definition of a kit may entail one or more component identifiers, an assembly identifier, a system identifier, a material identifier, a combination of an assembly identifier and one or more components, a combination of a system and one or more components or another arrangement. Each kit may be identified by a distinct kit identifier that distinguishes a particular kit from other kits.

The correlation analyzer 20 may provide information that is used to identify the appropriate members or components of a kit. The members of the kit may include one or more of the following: one or more components, sub-components, systems, assemblies, and materials.

The correlation analyzer 20 may look to the correlation of replacement necessity for different components or materials. In one embodiment, the correlation analyzer 20 may evaluate historic correlations in replacement of two related components (or materials) of an item of equipment. The correlation analyzer 20 determines whether related components are sufficiently correlated or not to include both related components in a kit. For example, if the correlation for replacement of the two related components exceeds a minimum correlation or approaches a normalized correlation of one, then the components may be included in the same kit. Accordingly, the correlation analyzer 20 may be used to select the members (e.g., components or materials) of a group of a kit.

In alternate embodiments, the correlation analyzer 20 may evaluate correlation of a replacement based upon the correlation of failure of components, the correlation of maintenance in accordance with maintenance procedures, the correlation in historical maintenance records for replacement, or the like.

The efficiency manager 22 may also contribute to the definition or formation of a kit. The efficiency manager 22 may divide the equipment into equipment locations or zones of an item of equipment. A single kit may contain components associated with a corresponding unitary zone of the equipment or proximate locations of an item of equipment to facilitate ready replacement and/or convenient replacement of components that may be incident to other repair or maintenance procedures. Similarly, the efficiency manager 22 may look at assemblies and systems within the equipment to provide a list of components, assemblies, or systems that are readily replaced at once, or are technically advisable to replace at once because of mounting position on the equipment, mounting location on the equipment, zone of maintenance work with respect to the equipment, functional performance, safety, or other configuration goals.

The organized kit may represent a virtual kit and the supplier of components may be unaware of the existence of a kit. The virtual kit allows for the allocation of a specific component to that kit without a physical gathering of components having taken place. The virtual kit serves as a form of "reservation method" for a set of components within the virtual kit. The components of a virtual kit are allocated to a corresponding maintenance task, but are not necessarily packaged or physically, contemporaneously located at the same geographic location. The components of a particular virtual kit may be associated with a virtual kit identifier or another tag that serves as a link for identifying the components or members of the particular virtual kit.

Each component within a virtual kit may have any of the following types of data: a geographic location, a status indicator, and an availability date indicator. For example, a geographic location may define a warehouse location, a bin number within a warehouse location, an inventory location, an address, a state and city, a country, a location code, or the like. The status indicator may indicate whether a component is in the inventory of a maintenance provider, in transit to a maintenance provider, at a warehouse of the maintenance provider, at a warehouse of a supplier or a distributor, at the manufacturer, at a distributor, or at some other place in a distribution chain. The availability date indicator provides a date or an interval for which the component is expected to be available for a maintenance activity. All of the components of a particular virtual kit are preferably selected for the particular virtual kit such that their respective availability date indicators coincide with each other to form an availability date or availability interval for the entire virtual kit. Once all or most of the components of the particular virtual kit are available, the virtual kit may be transformed into a physical kit or group of parts that is made available for a planned maintenance activity at a particular time (e.g., the availability date or the availability interval).

Further, the actual gathering and assembly of the kit may be transparent to a maintenance provider that uses the data processing system 10. Nevertheless, there is no need for the kit to be transparent to the supplier, the procurer, or acquirer, or any other maintenance provider. Kits (e.g., virtual kits) may be viewed as either "soft allocated" or "hard-allocated" to a specific instance of an identified item of equipment. Soft-allocated means that the kit is allocated or reserved for planned maintenance work, but the soft-allocated kit may be re-allocated to a different item of equipment if the priority of the different item is superior to the initial item of equipment. The relative priority of the initial item and the different item may be based on quality, schedule, cost, or any other suitable factor. "Hard allocated" means a specific item of equipment with sufficiently high priority such that the hard-allocation is not modifiable or reallocable to another item of equipment. Accordingly, hard-allocated components may be physically gathered and moved to the point of use in a different or more certain manner than soft-allocated components.

If desired, the acquisition module 24 may order equipment from a supplier in the form of acquisition data 15. The acquisition data 15 may be organized in the form of a purchase order for a kit of components, as opposed to an individual list of components. The ordering of kits may provide the maintenance provider with logistical advantage and may reduce labor of the maintenance provider in organizing the components into kits or in packing the components into kits or their functional equivalents that may otherwise take place. The ordering of components in kit form may reduce human intervention in clerical order entry or other administrative tasks that are susceptible to human errors.

The distribution module 26 may be triggered upon determining that a kit, or the components of the kit, are present in inventory, have been ordered from a supplier, or are expected on a particular delivery date or within a range of delivery dates. The distribution data 17 may forward the availability of the kits or their constituent components to maintenance workers, facility operators, purchasing agents, shipment agents, or others that are involved with distributing the kits to the geographic location where the equipment is located or is anticipated to be located.

Figure 2:
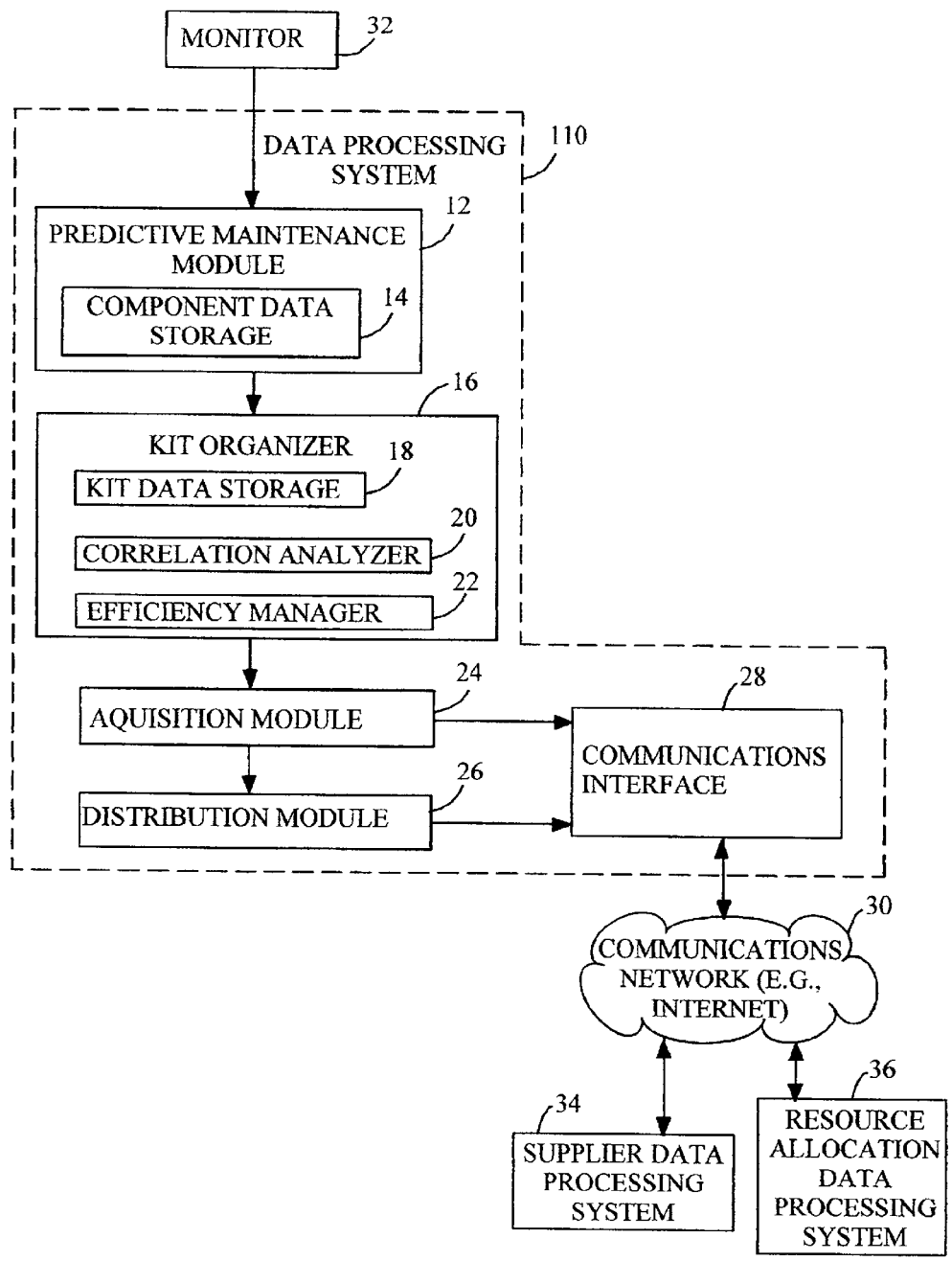
FIG. 2 shows a data processing system that is coupled to a monitor and a communications network in accordance with the invention.

FIG. 2 is a block diagram of a processing system 110 that is similar to the processing system 10 of FIG. 1 except the processing system 110 of FIG. 2 is associated with the following infrastructure: (1) a monitor 32 coupled to the predictive maintenance module 12 and (2) a communications interface 28 coupled to the acquisition module 24 and the distribution module 26. Like reference numbers in FIG. 1 and FIG. 2 indicate like elements.

The monitor 32 may comprise a sensor or another monitor associated with an item of equipment. The monitor 32 may provide predictive data 11 that assists the predictive maintenance module 12 in predicting when and what maintenance is required to support a requisite level of availability and reliability of the item of equipment, and at what levels of safety, compliance, and cost. The predictive data 11 may include operational data, an item identifier of an item of equipment, a component identifier of component of the item, test data from a diagnostic test associated with the item or a component of the item, or other information for performing predictive maintenance on the equipment.

The acquisition module 24 and the distribution module 26 are coupled to a communications interface 28. The communications interface 28 provides an interface between the acquisition module 24, the distribution module 26, or both, and the communications network 30. For example, in one embodiment, the communications interface 28 may comprise a data packet transceiver that supports the transmission and reception of data packets over a communications network 30, such as the Internet. The communications network 30 may comprise a circuit-switched communications network, a digital packet communications network, a data packet network, or another communications arrangement. The communications network 30 may communicate with a supplier data processing system 34 and a resource allocation data processing system 36. The communications interface 28 supports communications with the supplier data processing system 34 via the communications network 30. Similarly, the communications interface 28 supports communications with the resource allocation data processing system 36 via the communications network 30. The supplier data processing system 34 may support order fulfillment of a component, multiple components, a kit, an assembly, or a system.

The resource allocation data processing system 36 may be associated with a maintenance service provider. The resource allocation data processing system 36 may include a notification arrangement for notifying workers for upcoming or imminent maintenance tasks (e.g., MRO tasks). The resource allocation data processing system 36 may also include distribution data processing for assuring that kits and components are delivered to the proper geographic location where an item of equipment is located.

Figure 3:
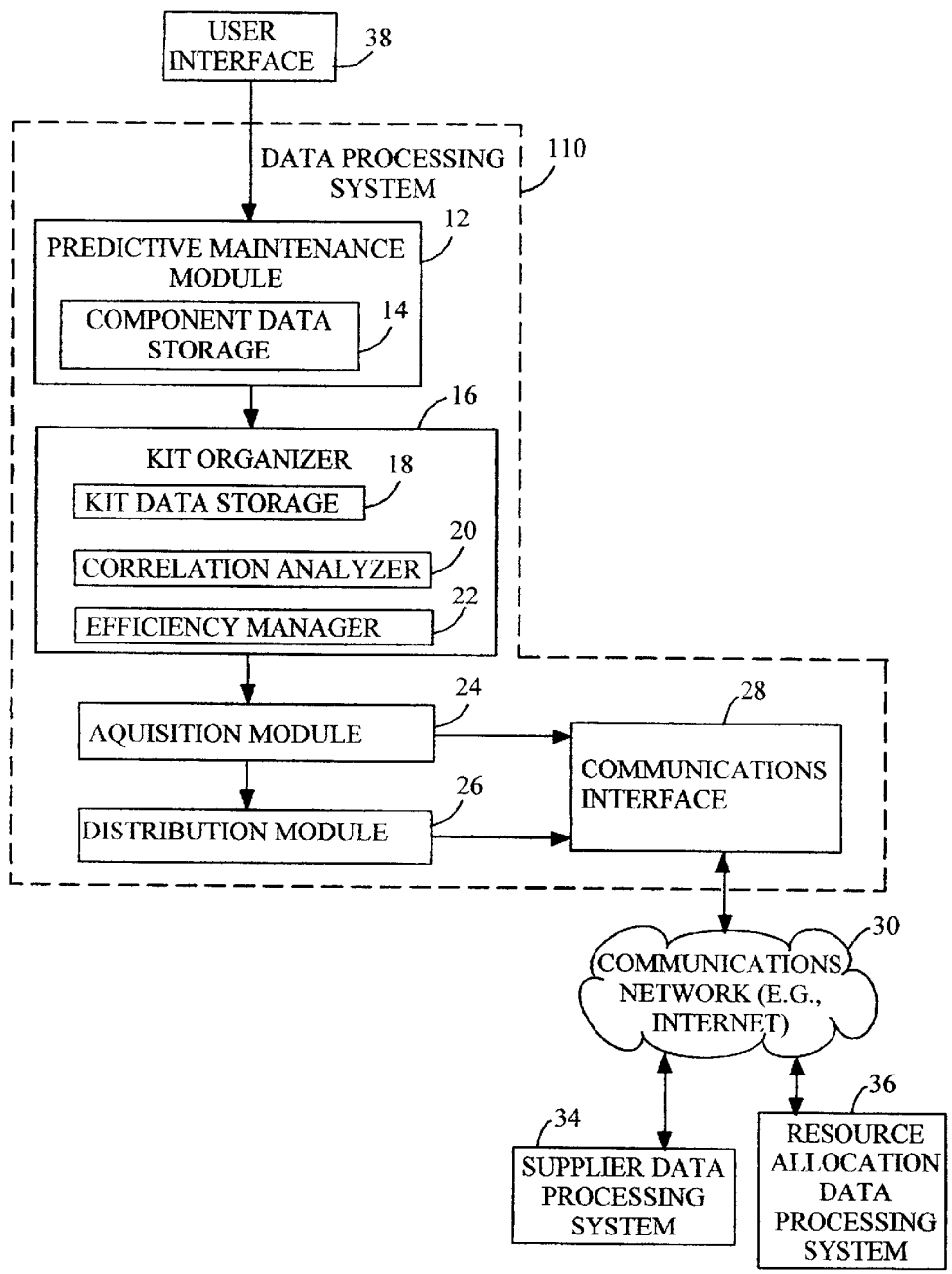
FIG. 3 shows a data processing system that is coupled to a user interface and a communications network in accordance with the invention.

FIG. 3 illustrates another embodiment of a data processing system 110 in accordance with the invention. FIG. 3 is similar to the embodiment of FIG. 2 except that FIG. 3 includes a user interface 38 instead of the monitor 32. Like reference numbers in FIG. 1 and FIG. 3 indicate like elements.

The user interface 38 allows a user (e.g., a maintenance provider) to manually enter input data or provide input data through a magnetic media, an optical media, or another processor readable media. For example, the user interface 38 may allow a user to enter historic replacement data associated with components of an item of equipment. The historical replacement information may be used by the predictive maintenance module 12 to decide when predictive maintenance should be scheduled. The user interface 38 may also support the entry of data from a visual inspection or other inspection of zones of the equipment or other parts of the equipment. A technician or maintenance worker may inspect an item of equipment and enter his findings via the user interface 38, for example.

Figure 4:
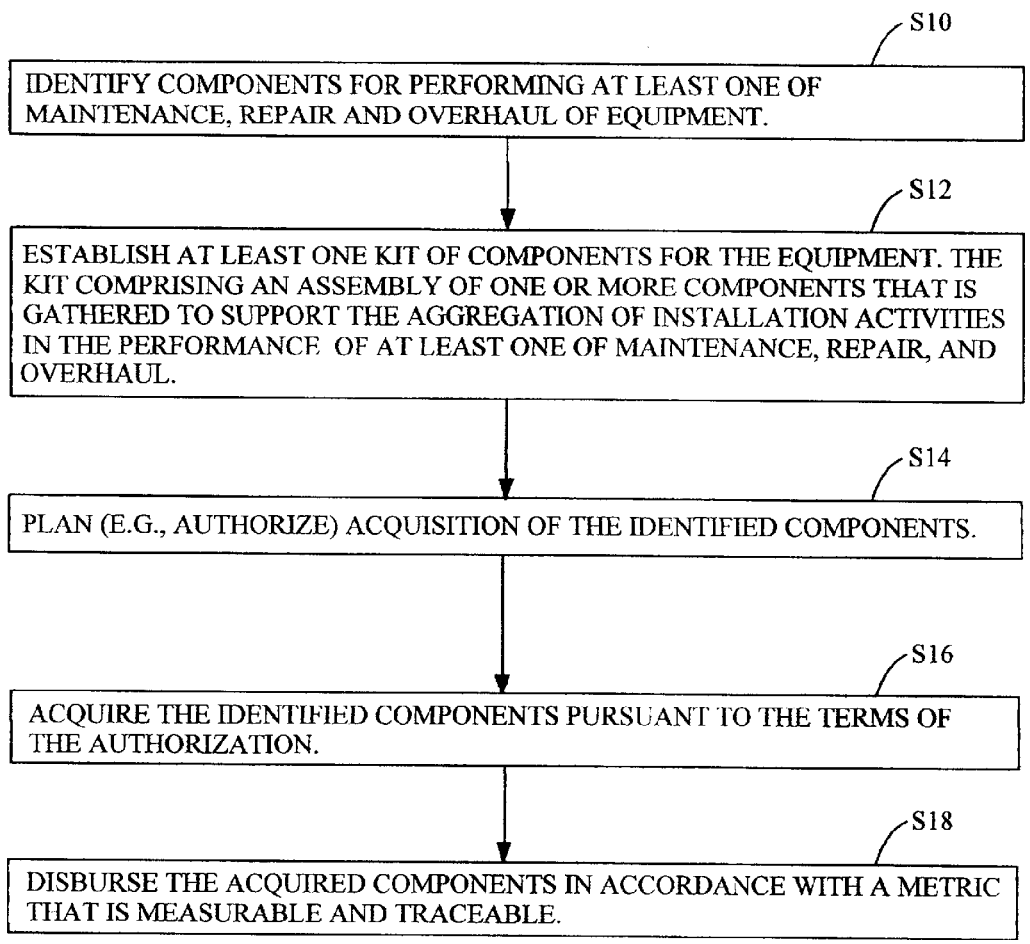
FIG. 4 shows a flow chart of a method for provisioning of components in accordance with the invention.

FIG. 4 shows a method for providing components associated with performance with at least one of maintenance, repair, and overhaul (i.e., MRO) of equipment. The method of FIG. 4 starts in step S10.

In step S10, components are identified for performing at least one of maintenance, repair, and overhaul of equipment. In one embodiment, the predictive maintenance module 12 for the data processing system 10 identifies one or more components for performing at least one of maintenance, repair, and overhaul of equipment. For example, the predictive maintenance module 12 may identify one or more components as requiring maintenance attention. The identified components, which require maintenance attention, are predicted to fail or estimated to cause problematic or unwanted issues in the equipment or a particular item of equipment in the future. Problematic or unwanted issues may refer to an actual or possible deficiency in the equipment or a component thereof, where such deficiency affects quality, safety, performance, reliability, or another factor identified by the maintenance provider.

The predictive maintenance module 12 may identify the components that are the subject of predictive maintenance by historical failures of the equipment, historical service records, operational or performance data of a component, operational or performance data of the equipment, performance tests, or other indicators of potential perspective problems with a component, a system, an assembly, or the equipment. The identified components are consistent with a configuration of the equipment. The configuration may include one or more of the following: (1) at least a set of constituent components for a particular piece of equipment and (2) at least a set of constituent subcomponents for a particular component of equipment.

In one embodiment, step S10 comprises communicating a requirement (e.g., quantity and a corresponding component identifier) for a corresponding one of the components in real-time to a supplier. The communication of the requirement preferably affords the supplier with as much notice as possible on the identity of components to enable the supplier to manufacture, make, procure, or otherwise acquire required components or materials in advance of the maintenance provider's actual demand for the requisite components and materials.

In another embodiment, step S10 may comprise tracking a status of a component in a configuration of the equipment by verifying the currency of at least one of the components of the configuration with a certain minimum frequency prior to the acquisition (e.g., in step S16). Further, the data processing system 10 may update a status of configuration information on the equipment with sufficient frequency to minimize acquisition of obsolete components for prior configurations of the equipment.

In step S12, the kit organizer 16 or the data processing system 10 establishes at least one kit (e.g., a virtual kit or a physical kit) of components for the equipment. The kit of components may contain at least one identified component that was identified in step S10 as requiring maintenance attention. The other component in the kit, or assemblies, or systems of the kit, may supplement the identified component with respect to maintenance, repair, or overhaul activity. For example, the kit may comprise a group (e.g., an assembly) of one or more components that are gathered to support the aggregation of installation activities or other maintenance tasks in the performance of at least one of maintenance, repair, and overhaul.

The kit of components may be defined by a correlation analyzer 20, an efficiency manager 22, or both. The correlation analyzer 20 may look to the identified component and may determine if there is a correlation (of replacement) between the identified component(s) and another component, another system, or another assembly. The correlation of replacement would indicate whether replacement of the identified component was or should be associated with replacement of another component, system, or assembly on a historical basis such that efficiencies may be realized in replacing or otherwise servicing multiple components together.

The efficiency manager 22 may look to the system or assembly with which a subject identified component is associated and may determine if other parts associated with the system or assembly could be efficiently replaced at the same time as the identified component. For example, other parts associated with the system, assembly, or identifier component may be efficiently serviced if all of the affected components that require service happen to be located in the same or proximate location, same section, same zone, same position, or the same or proximate mounting area of the equipment. If the affected components are located in the same location or proximate location, the same zone, the same section or mounting area, then the kit contents may be established accordingly to include one or more supplemental components or supplemental materials to enhance the efficiency of the maintenance of the equipment. For example, the kit contents may be established to include the supplemental component, supplemental assembly, or a supplemental system may be added to the kit such that the performance of maintenance, repair, and overhaul minimizes maintenance time, reduces the requisite human resources, and eliminates the necessity for duplicative or similar repairs that could be conducted in a single concentrated effort.

In one embodiment, a kit may be defined by at least one component identifier. The kit may be associated with a configuration identifier or a kit identifier to distinguish kits for different configurations of equipment from one another. Further, the kit may be defined by one or more of the following: a serial number of at least one respective component, a unique identifier of at least respective component, a serial number of at least one assembly of the equipment, a unique identifier of at least one assembly of the equipment, a serial number of a respective system, a unique identifier of a respective system, a serial number of a kit, and a unique identifier of a kit. In one embodiment, the kit may comprise a virtual kit, in which the components of the virtual kit are reserved or allocated for prospective availability to a maintenance task.

The kit may be associated with a status. The status may be expressed as one or more of the following status indicator values: pre-staged, staged, and disbursed with respect to the maintenance of a particular item of equipment per a defined maintenance plan. Pre-staged means the kit has not yet been allocated by reserving the components or materials for a maintenance plan or at least a forecasted maintenance plan. Staged means the kit has been allocated by reserving the components or materials for a maintenance plan or at least a forecasted maintenance plan. Disbursed means the kit has been distributed to a maintenance service provider consistent with a defined maintenance plan. For example, the kit may be disbursed (e.g., shipped or distributed) to a particular geographic location of a repair facility at a particular time to coincide with the availability of other resources necessary to complete the maintenance activity (associated with the kit).

In one embodiment, a kit or a component may be associated with other additional statuses that the data processing system 10 tracks. For example, a kit or a component may be associated with a user-definable status as an additional status defined by a user. An additional status of a component or a kit may include one or more of the following: installed, deferred, and returned to stock. Installed represents a confirmation that a component or a kit was installed on an item of equipment. A technician or another worker may enter data into the data processing system 10 when an installation procedure is successfully completed. Deferred means that the component or kit was not installed on the particular item of equipment. Returned-to-stock means that a material, a component, or a kit is no longer allocated to a particular item of equipment and may be allocated to the performance of maintenance on other items of equipment.

The method continues with step S14 after step S12. In step S14, an acquisition module 24 or a data processing system 10, may prepare for (e.g., authorize) the acquisition of the identified component. For example, the acquisition module 24 may authorize the acquisition of the kit established in step S12 or at least one constituent member of the kit. The kit may include one or more of the following members: the identified component, one or more supplemental components, an identified assembly, an identified system, supplemental system, and a supplemental assembly.

In one embodiment, the acquisition preparation and/or acquisition is altered in response to a change in the currency or accuracy of the identification of at least one of the components or materials. The change in the identification of the at least one component or material is handled consistent with step S10.

In step S16, the acquisition module 24 may acquire the identified component pursuant to the terms of the preparation (e.g., authorization) of step S14. Where the preparation includes an authorization of acquisition, the terms of the authorization may include a desired delivery date or an availability date and location. The authorized terms may also include the price of the equipment and the quantity of the equipment or other information associated with the purchasing or procurement of the identified components.

Step S16 may be carried out in an automated fashion with minimal human intervention, consistent with FIG. 2. For example, the acquisition module 24 may communicate with the supplier data processing system 34 via the communications interface 28. The supplier data processing system 34 may fulfill orders, or order requests, on identified components that are transmitted from the acquisition module 24 to the supplier data processing system 34 (via the communications interface 28). The acquisition module 24 may provide the terms of the identified component. The supplier data processing system 34 may provide an acknowledgment of the receipt of an order or request for acquisition of identified components. The confirmation may include a confirmed delivery date or an estimated delivery date associated with the components that were requested.

In one example, step S16 comprises notifying one or more applicable component providers of data on the kit to support at least one of a kit control procedure, a kit change procedure, and a modification procedure for the equipment. A kit control procedure refers to a logistics, ordering, tracking, record-keeping or administrative procedure for handling the acquisition (e.g., procurement) of a kit. A kit change procedure describes how a maintenance provider and a supplier of components or materials for a kit interact to assure that the kit contents are accurate, in the face of one or more changes to the kit contents. A modification procedure may require a maintenance provider and a supplier of components or materials modify or redefine kit contents to meet a modified or static maintenance requirement of the equipment on a timely, dynamic basis.

In step S16, the acquiring of components or materials may be executed in accordance with several complementary procedures, which may be implemented individually or collectively. Under a first procedure for step S16, the acquisition comprises establishing lead times of respective components and updating the lead times associated with corresponding suppliers of the components. Under a second procedure, the acquiring includes tracking availability of components of corresponding suppliers and tracking delivery dates or delivery durations of the components. Under a third procedure, the data processing system 10 tracks components undergoing maintenance and designates the availability of the tracked components upon at least one of initiation and completion of the maintenance. Under a fourth procedure for step S16, the acquiring comprises maintaining a pool of spare components that are restorable to specific levels of performance. Further, the restored components of the pool of spare components are substituted for the ordering of generally equivalent components from one or more suppliers to realize planning, logistical or economical savings.

In step S18, the distribution module 26 or the data processing system 10 disburses the acquired components in accordance with the metric (e.g., preferably a measurable and traceable metric). Accordingly, the distribution module 26 determines if an identified component is in inventory, or available, for deployment or shipment to a geographic location where an equipment is located, or will be located when scheduled maintenance, repair, or overhaul activities are to take place. The distribution module 26 may facilitate the coordination of human resources, the resources of facilities, the availability of the equipment for repair, and the availability of parts, and scheduling matters and distribution of identified components or kits for maintenance, repair, and overhaul activities.

In one embodiment, step S18 comprises delivering the kit of components to particular equipment at a defined geographic location in accordance with a delivery schedule. For example, the kit of components may be distributed to the defined geographic location prior to planned maintenance activities in preparation for the scheduled maintenance.

The maintenance plan of FIG. 4 and other methods disclosed herein may support cannibalization of components from a secondary item of equipment to support greater availability or a requisite level (e.g., maximum level) of availability of a primary item of equipment. In the event where already installed components must be removed from one end item to support another end item of higher priority (i.e., cannibalization activities), the data processing system manages configuration and status tracking transactions in a manner which supports full traceability of the component removal authorization. In one embodiment, a closed loop control mechanism of the data processing system 10 may assure that any "cannibalized" component is restored to its proper use or otherwise accounted for prior to the closure of a cannibalization transaction.

The closed loop control mechanism may include the following procedure. First, update of the removal transaction to show "removed" prior to physical component removal of the cannibalized component from the secondary item of equipment. Second, the information "leads" the physical change to the primary item of equipment, the secondary item of equipment, or both. Third, update of the installation transaction of the primary item of equipment is delayed until the component is physically verified as in place in the primary item of the equipment. During the closed loop control mechanism, "pending" conditions are recognized within the configuration database regarding "authorized—not removed", "authorized—removed/not replaced" or otherwise.

Figure 5:
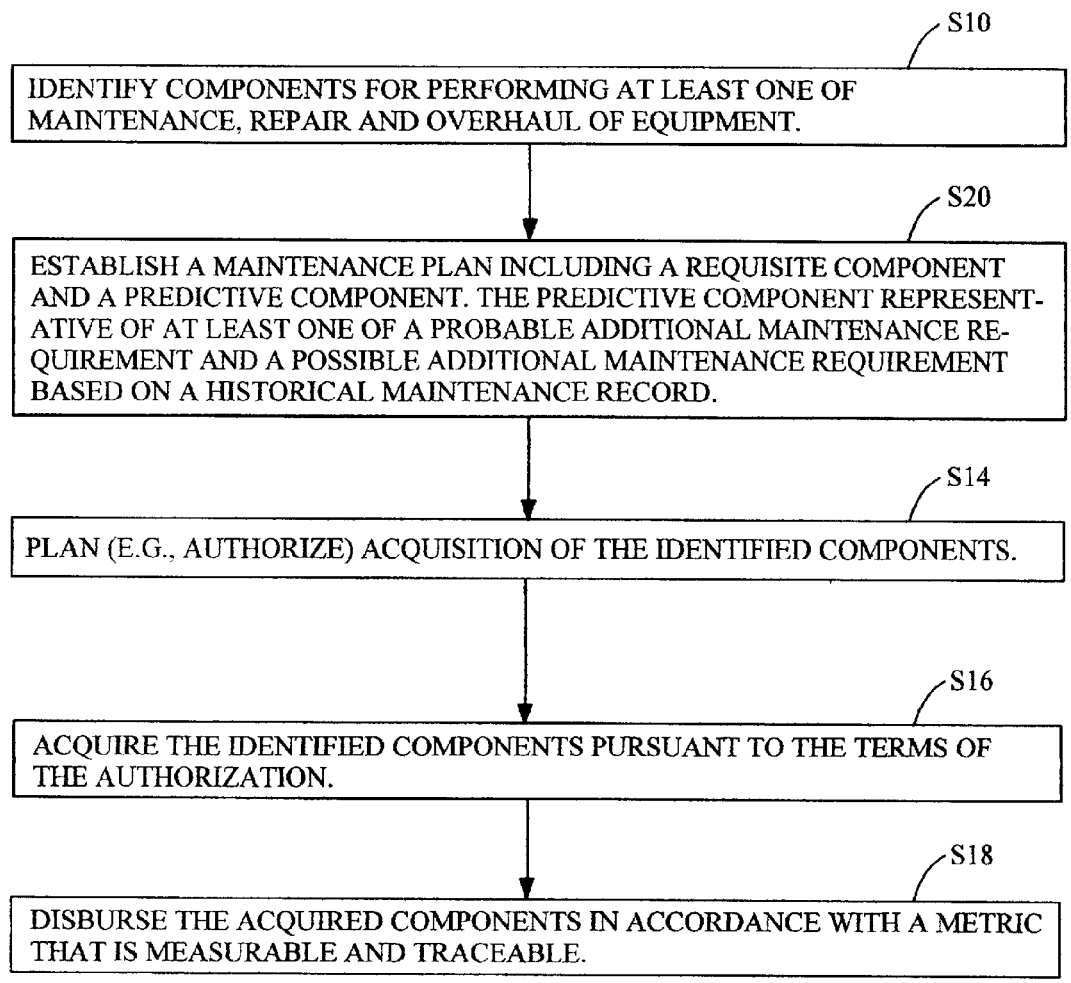
FIG. 5 shows an alternative embodiment of a method for providing components in accordance with the invention.

The method of FIG. 5 is similar to the method of FIG. 4 except step S112 in FIG. 4 is replaced by step S20 in FIG. 5. Like steps or procedures in FIG. 4 and FIG. 5 are indicated by like reference numbers.

Step S20 may follow step S10 of FIG. 5. In step S20, a maintenance plan is established including a requisite component and a predictive component. The predictive component is representative of a probable additional maintenance requirement, a possible additional maintenance requirement, or both. The possible additional maintenance requirement may be based on a historical maintenance record of the equipment or of a zone of the equipment in which an identified requisite component is being replaced. For example, the possible additional maintenance requirement may be determined by determining if a requisite component having a correlation of replacement with a possible additional maintenance requirement exceeds a minimum of threshold correlation to justify the placement to maintain the availability and reliability of an item of equipment.

In step S20, the predictive component may supplement the requisite component to facilitate improved economical or logistical efficiency in the maintenance of equipment. The supplementing of the requisite component with the predictive component permits integration of acquisition of the requisite component and the predictive component. Accordingly, the maintenance provider may be able to acquire the requisite component and the predictive component together, as a kit, or in a more efficient fashion than otherwise possible. Further, the supplementing the requisite component with the predictive component permits integration of installation of the requisite component with the predictive component, which may reduce the installation time or reduce the overall down-time of the equipment.

Step S20 may be carried out in accordance with several alternate techniques. Under a first technique, the data processing system 10 or a worker determines that the predictive component and the requisite component are associated with the same location, zone, sector, or mounting area of the item of equipment. For example, the data processing system 10 or a worker identifies the predictive component as associated with a component location of the requisite component. Under a second technique, a data processing system 10 identifies the predictive component as a component implicated in the maintenance of the requisite component. Under a third technique, a data processing system 10 assigns a probability of correlated performance level for the predictive component and organizes the requisite component and the predictive component into a kit if the probability of a correlated performance level meets or exceeds a minimum probability threshold level. Under a fourth technique, the data processing system 10 assigns a performance discrepancy level (i.e., the extent of performance degradation of an item of equipment) that may occur if related components are not serviced or replaced in a generally contemporaneous manner. If the performance discrepancy level meets or exceeds a minimum probability threshold level, the data processing system 10 may organize the related components as a kit.

After step S20, the method may continue with step S14. The method of FIG. 5 may invoke the cannibalization procedure and/or the closed loop control mechanism that was described in conjunction with FIG. 4.

The method of FIG. 5 may include an additional step that defines a configuration for the equipment in accordance with a single-dimensional or multidimensional descriptors. In one example, the configuration may be defined as including at least one of a functional descriptor, a logical descriptor, a physical descriptor, an operational descriptor or another configuration descriptor of at least one component or of an item of equipment. In another example, the configuration may be defined as including at least one of a functional descriptor, a logical descriptor, a physical descriptor, and an operational descriptor of at least one assembly of components.

A physical descriptor identifies or describes a physical configuration of an item of equipment. A functional descriptor identifies or describes a functional configuration of an item of equipment. A logical descriptor identifies or describes a logical configuration of an item of equipment. An operational descriptor identifies or describes an operational configuration of an item of equipment. A physical configuration defines or identifies one or more of the following: components, subcomponents, a system, and an assembly for a complete, operational item of equipment. A logical configuration defines the interrelationships among components, sub-components, a system, an assembly, or other components of equipment. A functional configuration defines what technical specifications (e.g., performance specifications) the item of equipment is expected or desired to meet. An operational configuration defines the operational performance of a particular item of equipment, with respect to the particular item as a whole, or any of its constituent parts, including components, subcomponents, assemblies, and systems.

Other configuration descriptors may apply to redundant configuration or a self-healing configuration, for example. A redundant configuration may include duplicate measures or secondary components, systems, or assemblies that take over upon the failure of primary component, system or assembly. A self-healing configuration may include architecture that is fault tolerant with respect to redundant software, redundant hardware, or other technical enhancements.

Figure 6:
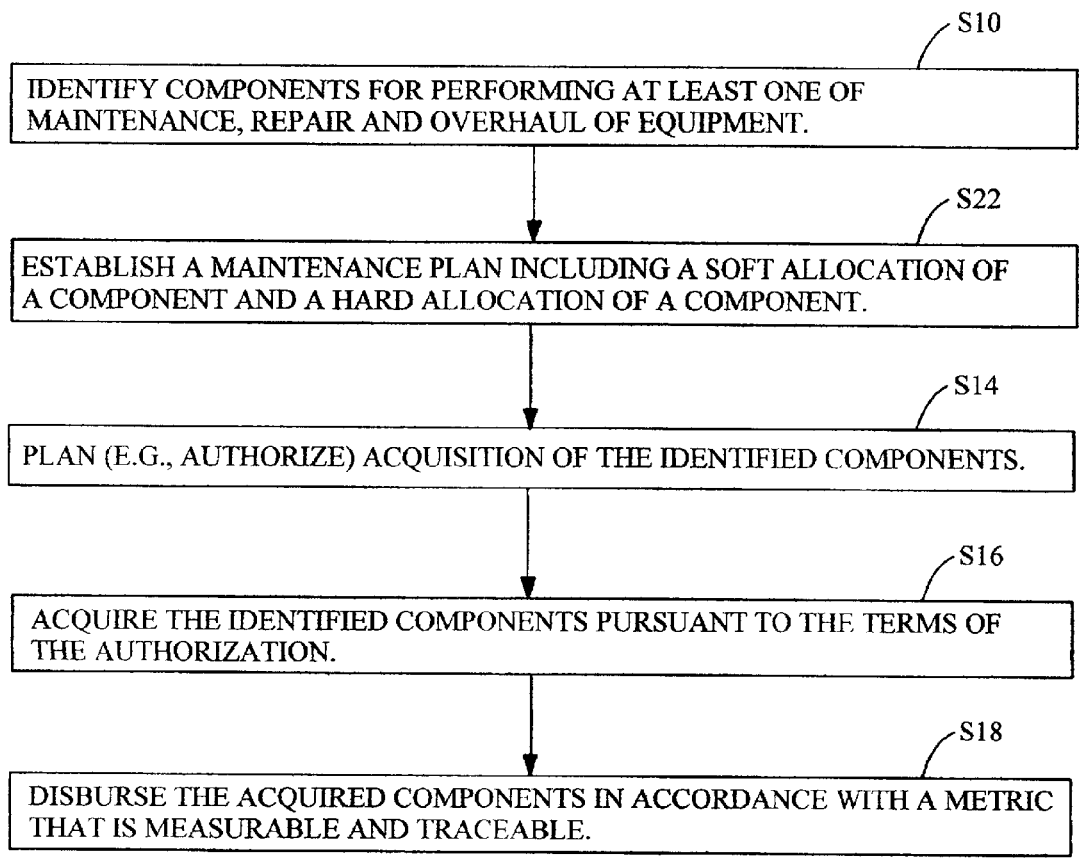
FIG. 6 shows another alternative embodiment of a method for providing components in accordance with the invention.

The method of FIG. 6 is similar to the method of FIG. 4 except step S12 in FIG. 4 is replaced by step S22 in FIG. 5. Like steps or procedures in FIG. 4 and FIG. 6 are indicated by like reference numbers.

In step S22, the data processing system 10 establishes a maintenance plan including a soft allocation of a component (or a material) and a hard allocation of a component (or a material). A soft-allocation means that a component, material or a kit is allocated or reserved for planned maintenance work of an initial item, but the soft-allocation may be re-allocated to a different item of equipment if the priority of the different item is superior to the initial item of equipment. The relative priority of the initial item and the different item may be based on quality, schedule, cost, or any other suitable factor. A hard-allocation means a specific item of equipment with sufficiently high priority such that the hard-allocation is not modifiable or re-allocable to another item of equipment. Accordingly, a hard-allocation of a component, material or a kit may be physically gathered and moved to the point of use in a different or more certain manner than a soft-allocation.

In one embodiment of step S22, the data processing system 10 may augment the hard allocation, based on known maintenance requirements for the equipment, with the soft allocation, based on a predictive maintenance analysis.

In another embodiment of step S22, the data processing system 10 may subsequently allocate a component initially associated with the soft allocation to the hard allocation, where the component is subsequently required for maintenance consistent with the maintenance plan.

In another embodiment of step S22, any soft allocation shortfalls created with the soft allocated units is adjusted via system recommended acquisitions, or placement of demands on suppliers by the procurement system.

In yet another embodiment of step S22, the soft allocation is based upon reference to a decision support matrix. The decision support matrix comprises a requisite task, a location of the soft allocation component relative to the requisite task within the equipment, and a probability of failure factor for the component associated with the requisite task.

In an alternate embodiment, the method of FIG. 6 may further include establishing requisite levels of availability for the equipment and establishing the maintenance plan of step S22 based on the established requisite levels.

Step S14 may follow step S22. In step S14, the data processing system 10 may determine a minimum of component inventory and a planned shipment schedule corresponding to components pursuant to the soft allocation. The data processing system 10 may use a maintenance forecast as input to determine the soft allocation.

In one embodiment, the acquisition planning of step S14 may include summarizing component inventory and raw material acquisition needs within the relevant lead time schedule window; establishing minimum inventory and economical lot quantity purchases. During the acquisition of step S16, the established minimum inventory and economical lot quantity purchases are activated. Further, step S14 may include estimating components required for unplanned maintenance work, whereas step S16 may comprise procuring components required for unplanned maintenance work associated with the equipment.

In an alternate embodiment, the maintenance plan of step S22 may support removal of at least one component of one equipment to support a requisite level of availability of at least one second equipment, if the at least one second equipment has a higher priority for availability than the first equipment. The removal of the component follows an authorization procedure, a status tracking procedure, and traceability of the authorization procedure and the tracking procedure.

The foregoing description of the method and system for performing predictive maintenance describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein, and not unduly limited by aspects of the preferred embodiments disclosed herein.

We claim:

1. A method for component provisioning or issuance, the method comprising:

identifying components for performing at least one of maintenance, repair, and overhaul of equipment;

determining a replacement correlation between a first component and a second component of the components;

establishing a kit of components for the equipment, the kit comprising identified components comprising both the first component and the second component when the replacement correlation exceeds a pre-selected minimum correlation, the identified components gathered to support an aggregation of maintenance activities in performance of at least one of maintenance, repair, and overhaul;

associating the kit with a status indicator; and preparing to acquire the identified components.

2. The method according to claim 1 further comprising:

acquiring the identified components pursuant to terms of an authorization established according to the preparing; and disbursing the acquired components in accordance with a metric that is measurable and traceable.

3. The method according to claim 2 wherein the acquiring step comprises notifying applicable component providers of data on the kit to support at least one of a kit control procedure, a kit change procedure, and a modification procedure for the equipment.

4. The method according to claim 2 wherein the disbursing comprises delivering the kit of components to the equipment at a defined geographic location in accordance with a delivery schedule.

5. The method according to claim 2 wherein the disbursing comprises distributing components prior to planned maintenance activities in preparation for scheduled maintenance.

6. The method according to claim 1 wherein the establishing comprises establishing at least one virtual kit as the kit, the kit being associated with a component identifier.

7. The method according to claim 1 wherein the establishing comprises establishing at least one virtual kit as the kit, the kit being associated with a configuration identifier.

8. The method according to claim 1 wherein the establishing comprises establishing at least one virtual kit as the kit, the kit being associated with a component serial number, a component part number, or an assembly of the equipment.

9. The method according to claim 1 wherein the status indicator changes between pre-staged, staged, and disbursed with respect to the maintenance of the equipment.

10. The method according to claim 1 wherein the identifying comprises communicating a requirement for at least one of the components in real-time to a supplier.

11. The method according to claim 1 wherein the components comprise an equipment configuration, and where the identifying comprises tracking a component status of at least one of the components in the equipment configuration by verifying currency of at least one of the components in the equipment configuration with a pre-selected minimum frequency prior to the acquisition.

12. The method according to claim 11 wherein the preparing for acquisition of identified components is altered in response to a change in the currency of at least one of the components.

13. The method according to claim 1 further comprising updating a status of configuration information on the equipment with sufficient frequency to minimize acquisition of obsolete components for prior configurations of the equipment.

14. The method of claim 1, where the status indicator is 'installed' when the kit has been installed in the equipment.

15. The method of claim 1, where the status indicator is 'deferred' when the kit has not been installed in the equipment.

16. The method of claim 1, where the status indicator is 'returned-to-stock' when at least one of the identified components is no longer allocated to the equipment.

17. The method of claim 1, where the status indicator is 'pre-staged' when the kit has not yet been allocated by reserving the components.

18. The method of claim 1, where the status indicator is 'staged' when the kit has been allocated by reserving the components.

19. The method of claim 1, where the status indicator is 'disbursed' when the kit has been distributed to a maintenance service provider.

20. A method for component provisioning, the method comprising:

identifying components for performing at least one of maintenance, repair, and overhaul of equipment, including defining a configuration as including at least a set of constituent components and subcomponents for a pre-selected piece of equipment;

establishing a maintenance plan including a requisite component and a predictive component, the predictive component representative of at least one of a probable additional maintenance requirement and possible additional maintenance requirements based on a historical maintenance record; and preparing for acquisition of the identified components.

21. The method according to claim 20 further comprising:

acquiring the identified components pursuant to terms of an authorization associated with the preparing; and disbursing the acquired components in accordance with a metric that is measurable and traceable.

22. The method according to claim 21 wherein the acquiring includes tracking availability of components of corresponding suppliers and tracking delivery dates or delivery durations of the components.

23. The method according to claim 21 wherein the acquiring comprises maintaining a pool of spare components that are restorable to specific levels of performance, restored components of the pool of spare components being substituted for the ordering of generally equivalent components from a supplier.

24. The method according to claim 20 wherein the establishing comprises identifying a location association between the predictive component and the requisite component.

25. The method according to claim 20 wherein the establishing comprises identifying the predictive component as implicated in maintenance of the requisite component.

26. The method according to claim 20 wherein the establishing comprises assigning a probability of a correlated performance level between the predictive component and the requisite component and organizing the requisite component and the predictive component into a kit if the probability at least meets a minimum probability threshold level.

27. The method according to claim 20 wherein the establishing step comprises supplementing the requisite component with the predictive component to permit integration of acquisition of the requisite component and the predictive component.

28. The method according to claim 20 wherein the establishing step comprises supplementing the requisite component with the predictive component to permit integration of installation of the requisite component with the predictive component.

29. The method according to claim 20 further comprising:
defining a configuration of the equipment, the configuration including at least one of a functional descriptor, a logical descriptor, a physical descriptor, and an operational descriptor of at least one component.

30. The method according to claim 20 further comprising:
defining a configuration of the equipment, the configuration including at least one of a functional descriptor, a logical descriptor, a physical descriptor, and an operational descriptor of at least one assembly of components.

31. The method according to claim 20 wherein the preparing for the acquisition comprises establishing lead times of respective components and updating the lead times associated with corresponding suppliers of the components.

32. The method according to claim 20 further comprising tracking components undergoing maintenance and designating the availability of the tracked components upon at least one of initiation and completion of the maintenance.

33. A method for component provisioning, the method comprising:
identifying components for performing at least one of maintenance, repair, and overhaul of equipment;
establishing a maintenance plan including a soft allocation component and a hard allocation component, where the soft allocation component is re-allocable based on an equipment priority and where the hard allocation is non-re-allocable;
authorizing acquisition of the identified components;
acquiring the identified components pursuant to authorization terms resulting from the authorizing step; and
disbursing the identified components in accordance with a metric that is measurable and traceable.

34. The method according to claim 33 further comprising establishing requisite levels of availability for the equipment and establishing the maintenance plan based on the established requisite levels.

35. The method according to claim 33 further comprising determining a minimum of component inventory and a planned shipment schedule corresponding to the soft allocation component.

36. The method according to claim 35 wherein the determined component inventory and raw material acquisition needs are summarized within a relevant lead time schedule window, and minimum inventory or economical lot quantity purchases are established and activated.

37. The method according to claim 33 further comprising applying a maintenance forecast to determine the soft allocation component.

38. The method according to claim 33 further comprising augmenting the hard allocation component, based on known maintenance requirements for the equipment, with the soft allocation component, based on a predictive maintenance analysis.

39. The method according to claim 33 wherein the soft allocation component is subsequently hard allocated with the hard allocation component, when the soft allocation component is subsequently required for maintenance consistent with the maintenance plan.

40. The method according to claim 33 wherein a soft allocation component shortfall is adjusted via system recommended acquisitions, or placement of demands on suppliers by a procurement system.

41. The method according to claim 33 further comprising estimating and procuring components required for unplanned maintenance work associated with the equipment.

42. The method according to claim 33 wherein the soft allocation component is selected based upon reference to a decision support matrix, the decision support matrix comprising a requisite task, a location of the soft allocation component relative to the requisite task within the equipment, and a probability of failure factor for a requisite task component.

43. The method according to claim 33 further comprising supporting removal of at least one component of one equipment to support a requisite level of availability of at least one second equipment, if the at least one second equipment has a higher priority for availability than the first equipment.

44. The method according to claim 43 wherein the removal of the component follows an authorization procedure and a status tracking procedure, and where the authorization procedure and the tracking procedure are traceable.

45. The method according to claim 33, where the step of establishing further comprises the steps of:
determining a replacement correlation between the soft allocation component and the hard allocation component, and
including both the soft allocation component and the hard allocation component together in a kit when the replacement correlation exceeds a pre-selected minimum correlation.

46. A method for initiating equipment maintenance, the method comprising:
defining an equipment configuration to include constituent components for a first pre-selected piece of equipment;
determining a replacement correlation between a first component and a second component of the constituent components;
establishing a kit for the equipment configuration, the kit comprising selected constituent components comprising both the first component and the second component, when the replacement correlation exceeds a pre-selected minimum correlation, the selected constituent components gathered to support an aggregation of maintenance activities in performance of at least one of maintenance, repair, and overhaul; and
preparing to acquire the kit of constituent components.

47. The method of claim 46, where the kit is a virtual kit.

48. The method of claim 46, further comprising the step of communicating in real-time a requirement for at least one of the selected constituent components to a supplier.

49. The method of claim 46, further comprising the step of associating the kit with a status indicator.

50. The method of claim 49, where the status indicator changes between 'pre-staged' when the kit has not yet been allocated by reserving the selected constituent components and 'staged' when the kit has been allocated by reserving the selected constituent components.

51. The method of claim 49, where the status indicator changes between 'staged' when the kit has been allocated by reserving the selected constituent components, and 'disbursed' when the kit has been distributed to a maintenance service provider.

52. The method of claim 49, where the status indicator is 'installed' when the kit has been installed in the first equipment.

53. The method of claim 49, where the status indicator is 'deferred' when the kit has not been installed in the first equipment.

54. The method of claim 49, where the status indicator is 'returned-to-stock' when at least one of the selected constituent components is no longer allocated to the first pre-selected piece of equipment.

55. The method of claim 46, further comprising the step of initiating removal of a selected component from a second pre-selected piece of equipment to support a requisite level of availability of the first pre-selected piece of equipment when the first pre-selected piece of equipment has a higher availability priority than the second pre-selected piece of equipment.

56. A method for initiating equipment maintenance, the method comprising:

defining an equipment configuration to include constituent components for a first pre-selected piece of equipment;

initiating removal of a chosen component from a second pre-selected piece of equipment to support a requisite level of availability of the first pre-selected piece of equipment when the first pre-selected piece of equipment has a higher availability priority than the second pre-selected piece of equipment; and establishing a kit for the equipment configuration, the kit comprising selected constituent components, including the chosen component, gathered to support maintenance, repair, or overhaul maintenance activities.

57. The method of claim 56, where the selected constituent components further comprise a re-allocable soft allocation component and a non-re-allocable hard allocation component.

* * * * *

UNITED STATES PATENT AND TRADEMARK OFFICE
CERTIFICATE OF CORRECTION

| | | |
|---|---|---|
| PATENT NO. | : 6,820,038 B1 | Page 1 of 1 |
| APPLICATION NO. | : 09/946894 | |
| DATED | : November 16, 2004 | |
| INVENTOR(S) | : Michael Wetzer et al. | |

It is certified that error appears in the above-identified patent and that said Letters Patent is hereby corrected as shown below:

In the Specification

In column 10, line 16, after "except step" delete "S112" and substitute --S12-- in its place.

Signed and Sealed this

Sixteenth Day of October, 2007

JON W. DUDAS
*Director of the United States Patent and Trademark Office*